United States Patent [19]
Dourra et al.

[11] Patent Number: 6,039,674
[45] Date of Patent: Mar. 21, 2000

[54] QUICK LEARN PROCEDURE FOR FILL VOLUMES OF AN ELECTRONICALLY CONTROLLED AUTOMATIC TRANSMISSION

[75] Inventors: Hussein Dourra, Dearborn Heights; Gerald L. Holbrook, Rochester Hills; Colt R. Correa, Lake Orion; David Parenti, Waterford, all of Mich.

[73] Assignee: DaimlerChrysler Corporation, Auburn Hills, Mich.

[21] Appl. No.: 09/277,444

[22] Filed: Mar. 26, 1999

[51] Int. Cl.⁷ ...................................... F16H 61/06
[52] U.S. Cl. ............................ 477/166; 477/180; 73/49.3
[58] Field of Search .................... 477/166, 174, 477/175, 180, 181; 73/49.3

[56] References Cited

U.S. PATENT DOCUMENTS

| | | |
|---|---|---|
| 4,270,646 | 6/1981 | Norcross . |
| 4,871,048 | 10/1989 | Chatterjea . |
| 4,875,391 | 10/1989 | Leising et al. . |
| 4,944,200 | 7/1990 | Benford et al. . |
| 4,982,620 | 1/1991 | Holbrook . |
| 4,982,826 | 1/1991 | Holbrook . |
| 5,038,286 | 8/1991 | Asayama et al. . |
| 5,046,174 | 9/1991 | Lentz et al. . |
| 5,058,460 | 10/1991 | Hibner et al. . |
| 5,216,606 | 6/1993 | Lentz et al. . |
| 5,231,898 | 8/1993 | Okura . |
| 5,456,647 | 10/1995 | Holbrook . |
| 5,467,854 | 11/1995 | Creger et al. . |
| 5,518,468 | 5/1996 | Sametz et al. . |
| 5,580,332 | 12/1996 | Mitchell et al. .................... 477/169 X |
| 5,737,979 | 4/1998 | McKenzie et al. .................... 74/731.1 |
| 5,853,076 | 12/1998 | McKee et al. ........................ 477/79 X |

*Primary Examiner*—Khoi Q. Ta
*Attorney, Agent, or Firm*—Mark P. Calcaterra

[57] ABSTRACT

The present invention provides a method for determining fill volumes of a plurality of clutch elements in an automatic transmission wherein each clutch element is applied in a predefined order and the fill volume of each clutch element is obtained by determining when the rotational speed of the engine varies from the rotational speed of the transmission's turbine by a predefined amount. The plurality of clutch elements comprises at least a 2C, 4C, UD, OD, and LR clutch element.

11 Claims, 3 Drawing Sheets

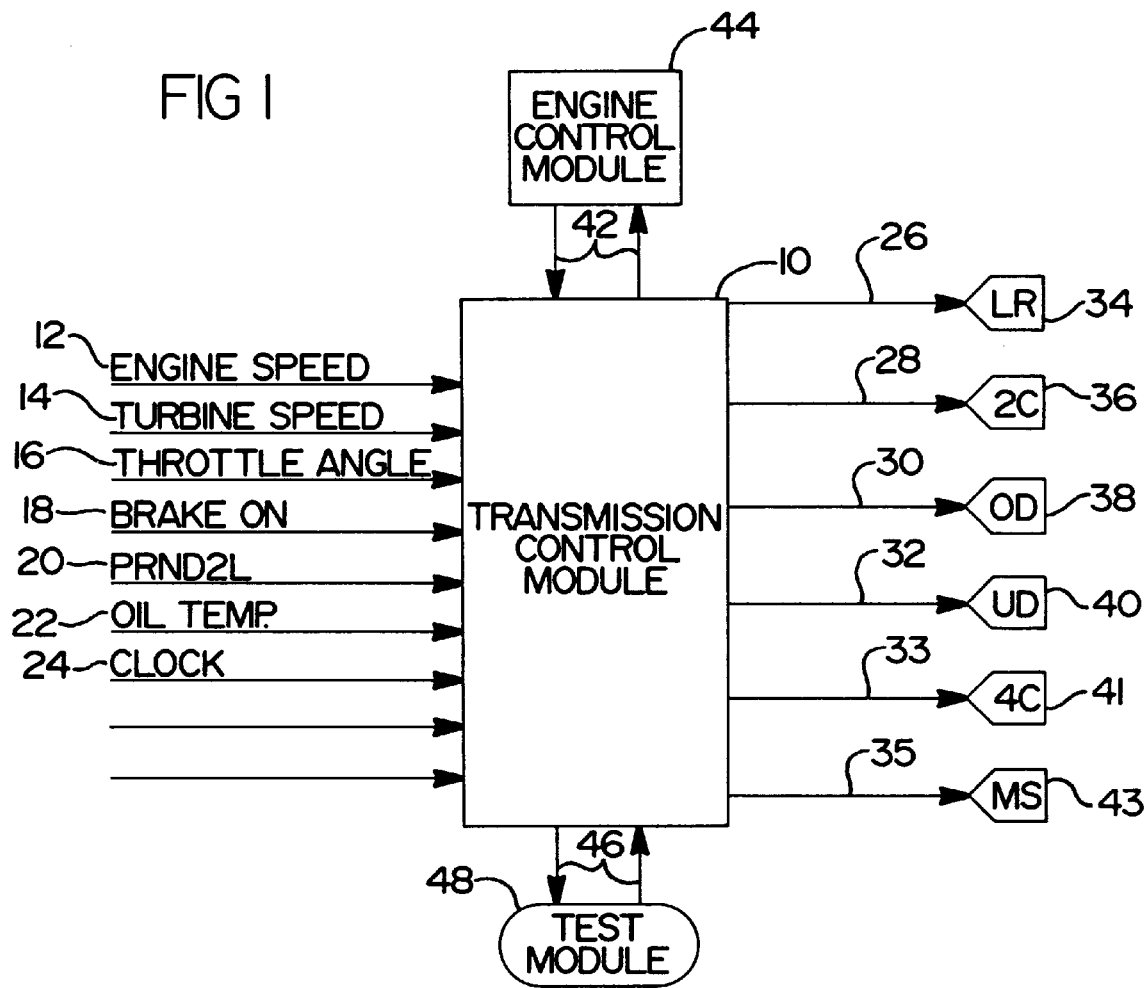

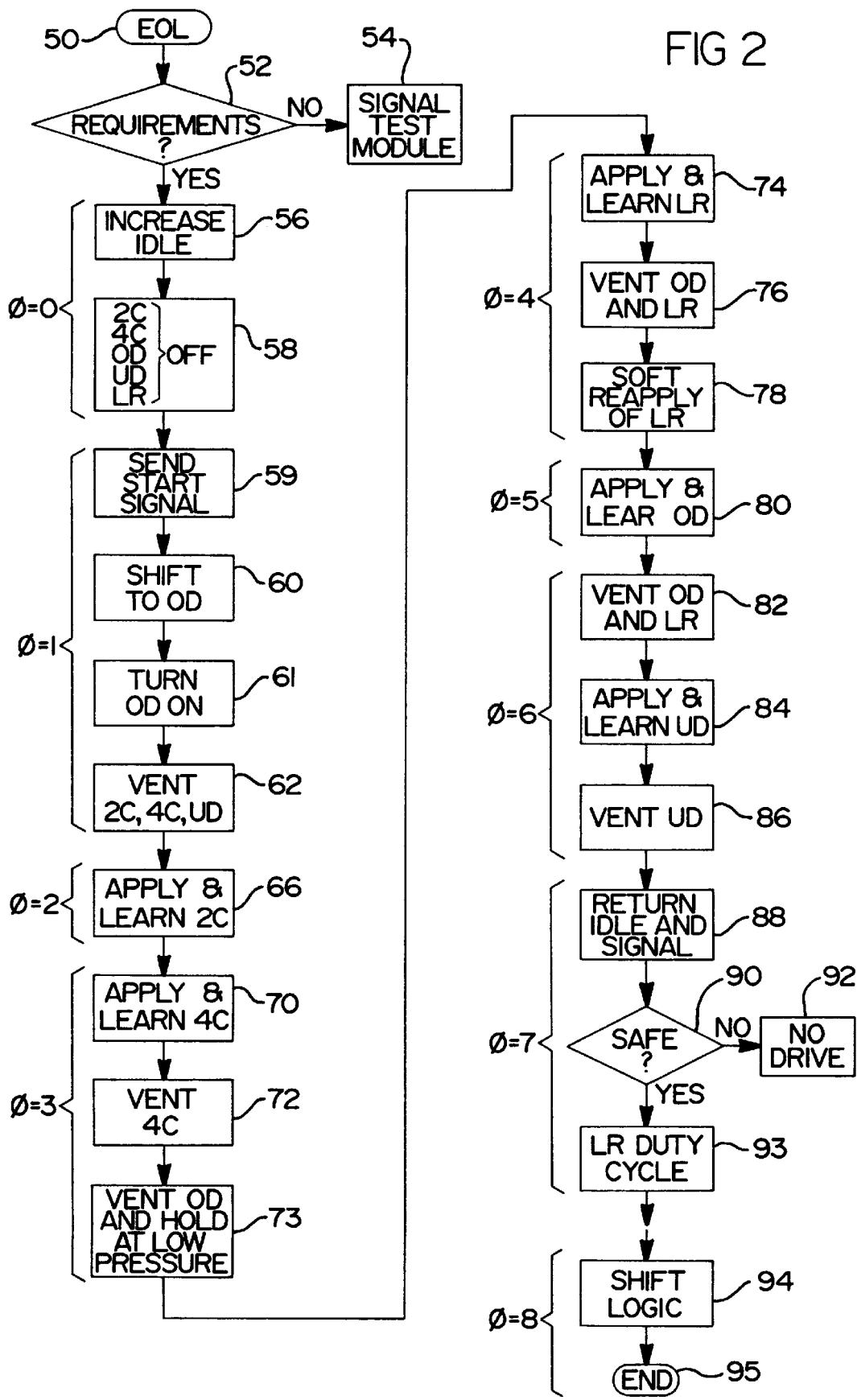

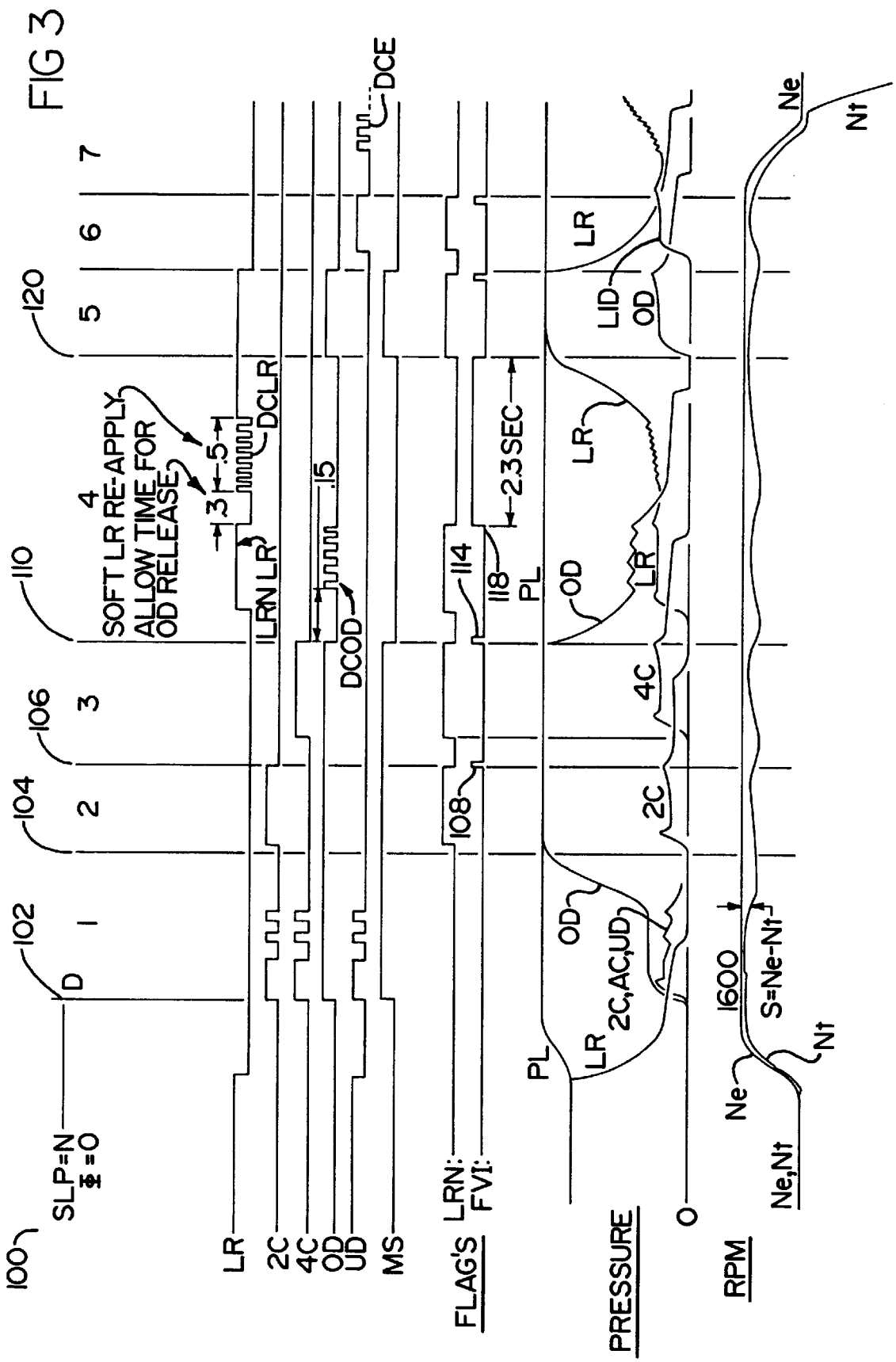

QUICK LEARN PROCEDURE FOR FILL VOLUMES OF AN ELECTRONICALLY CONTROLLED AUTOMATIC TRANSMISSION

BACKGROUND OF THE INVENTION

I. TECHNICAL FIELD

The present invention relates generally to an electronically controlled automatic transmission capable of independently learning the fluid fill volumes of its friction elements and, more particularly, to a volume learn sequence which enables the transmission to learn these volumes before the vehicle has been driven.

II. DISCUSSION

In the present design of automatic transmissions, a series of clutches or friction elements provide a means for application and release of separate members to and from each other during the flow of power through the transmission. These clutches thereby constitute the means by which gears within the transmission are selectively engaged or disengaged from either the engine crankshaft or the transmission case. Four speed transmissions, of the type which this invention is directed, generally include any number of elements or clutches which are applied or engaged in various combinations in relation to each of the vehicle's gears. Those in the present transmission include an underdrive clutch (UD), an overdrive clutch (OD), a second gear clutch (2C), a fourth gear clutch (4C) and a low/reverse clutch (LR). In addition, the LR clutch element has an overrunning clutch device connected to it. Each of these clutches generally includes a plurality of alternating clutch plates and clutch disks which, when applied, engage one another and which, when the clutch is not applied, are free to move or rotate relative to each other.

To apply each of these clutches, an electronically controlled hydraulic fluid actuating device such as a solenoid-actuated valve is used. There is typically one valve for each clutch, with the exception of the overrunning clutch, an underdrive clutch (UD) solenoid-actuated valve, an overdrive clutch (OD) solenoid-actuated valve, a second gear clutch (2C) solenoid-actuated valve, a fourth gear clutch (4C) solenoid-actuated valve and a low/reverse (LR) solenoid-actuated valve. However, in addition to the OD solenoid-actuated valve, an MS solenoid valve also feeds the OD element when the driver selected operating condition is drive. The same MS solenoid valve also feeds the 2C element when the driver selected operating condition is manual 2nd or low. These valves each control fluid flow to a respective clutch apply cavity. The flow of fluid into a clutch apply cavity results in the application or engagement of that clutch. Fluid flow is enabled by the opening of the solenoid-actuated valve in response to command or control signals received by the solenoid from an electronic control system.

The electronic control system typically includes a microcomputer-based transmission control module capable of receiving input signals indicative of various vehicle operating conditions such as engine speed, torque converter turbine speed, transmission output shift speed (vehicle speed), throttle angle position, brake application, predetermined hydraulic pressures, a driver selected gear or operating condition (PRND2L), engine coolant temperature and/or the ambient air temperature. Based on the information contained in these signals, the controller generates command or control signals for causing the actuation of each of the solenoid-actuated valves which regulate the application and release of fluid pressure to and from the apply cavities of the clutches or frictional units of the transmission. Accordingly, the controller is programmed to execute predetermined shift schedules stored in a memory of the controller through appropriate command signals to the solenoid-actuated valves.

Although in the manufacture of such transmissions each of the transmission components is machined to precise predefined dimensions, manufacturing tolerances or build variations often result in components having slightly larger or smaller dimensions. This may ultimately affect the hydraulic fluid fill volumes of each of the various clutches, or in other words, the volume of fluid which must be displaced to effectively apply or engage that clutch. These fluid fill volumes are used by the electronic transmission controller to effectively control fluid application to each element in order to provide an optimum shift quality or feel.

To account for build variations in transmission assemblies, methods for determining the fluid fill volumes in each assembled transmission, either during the life of the vehicle or immediately after assembly, have been developed. One method for determining fill volume immediately after assembly is generally disclosed in U.S. Pat. No. 5,456,647, entitled "End of Line Volume Learn sequence of Friction Element Fill Volumes For Automatic Transmission," issued on Oct. 10, 1995 to Holbrook. This patent is owned by the Assignee of the present application and is herein incorporated by reference. In this reference, the transmission control module determines the fill volume of each friction element after the transmission has been assembled. To determine the fill volume, each friction element is independently actuated while only one other element remains engaged. Torque converter slip, speed difference between the transmission input and the engine, signals when the friction element is engaged. The transmission controller senses this slip and is programmed to update originally stored fill volume values and learn from the results of its operation. A nominal volume value is stored in a non-volatile memory location but a learned volume value is stored for use by the transmission control logic in a battery backed RAM. This learned value is updated as each friction element is actuated and is thereafter used by the transmission controller to precisely control fluid flow and fully optimize shift quality. However, the application of this method to the present transmission has several drawbacks.

First, the transmission which the prior art is directed to contains four friction elements (an OD clutch, a UD clutch, a two/four shift clutch, and a LR clutch). The presence of the 2C and 4C clutches in the present transmission replaces the two/four shift clutch which the Holbrook method is directed to, thereby adding another friction element unaccounted for in the Holbrook device.

Second, The transmission which the present invention is directed to contains an overrunning clutch (ORC). The addition of the ORC prevents inputing engine torque through application of the UD clutch, as is done in the '647 patent while learning the volumes of the other elements. When the fill volume of the LR clutch element is being learned, and thus being filled, it is also necessary to maintain some fill in the OD element. The fluid pressure in the OD element must be maintained at a predetermined level low enough to allow the LR element to be filled and high enough to transfer some torque to the gear set.

Third, the present transmission provides dual feed to the OD element through the MS and OD solenoid valves while the shift lever is in the drive position. As a result, the OD clutch element fills faster, by virtue of there being two feed paths, than it would if only one solenoid was filling the element. Since the normal operation of this transmission uses both feed paths to apply the OD clutch element while operating in drive mode, it is necessary for both to be used when determining the fill volume. The transmission which the Holbrook method is directed to does not contemplate such a use. The present invention was developed in light of these drawbacks.

SUMMARY OF THE INVENTION

The present invention addresses the aforementioned drawbacks, among others, by providing a method for determining fill volumes of a plurality of clutch elements in an automatic transmission wherein each clutch element is applied in a predefined order and the fill volume of each clutch element is obtained by determining when the rotational speed of the engine varies from the rotational speed of the transmission's turbine by a predefined amount. In another aspect of the present invention, the plurality of clutch elements comprises at least a 2C, 4C, UD, OD and LR clutch element.

In another aspect of the present invention, the fill volume of the OD clutch element is determined last to allow purging of air from the clutch element and its supporting fluid circuit. Also, the rotational speed of the engine is increased to 1600 rpm to ensure proper transmission fluid pressure exists within the transmission for accurate fill volume determination. The UD clutch element is turned logically off before the LR fill volume is determined to ensure that a safe condition exists when the LR fill volume is being determined.

BRIEF DESCRIPTION OF THE DRAWINGS

The present invention will become more fully understood from the detailed description and the accompanying drawings, wherein:

FIG. 1 is a schematic diagram illustrating the transmission control system according to the present invention;

FIG. 2 is a flow chart illustrating the fundamental steps of the EOL volume learn sequence according to the invention; and FIG. 3 is a graphic illustration of the operation of the present invention.

DETAILED DESCRIPTION OF THE PREFERRED EMBODIMENTS

Referring now to FIG. 1, the end of line (EOL) fill volume learn sequence is now described. In FIG. 1, a transmission control module 10, which has a processor, random access and non-volatile memory, is shown.

Control module 10 also is adapted to interact as necessary with other vehicle electronic control modules. As shown, transmission control module 10 electrically communicates with a number of sensors to receive signals indicative of engine rotational speed 12, torque converter turbine rotational speed 14, throttle angle position 16, brake application 18, the gear or operating condition (PRND2L) 20, and transmission oil temperature 22. Each of these signals may be provided by one or more vehicle sensing devices (not shown) as commonly known to those skilled in the art. The transmission control module 10 provides an energizing signal to each of six solenoid actuating valves through buses 26, 28, 30, 32, 33 and 35. With respect to the LR, UD, 2C and 4C clutch elements, an energizing signal, or the absence of an energizing signal, on buses 26, 28, 30, 32, 33, and 35 causes the application and release of the associated frictional elements of the system by the underdrive (UD) clutch valve 40, 2nd shift (2C) clutch valve 36, 4th gear clutch valve (4C) 41 and low/reverse (LR) clutch valve 34. With respect to the OD clutch element, an energizing signal or absence thereof of overdrive (OD) clutch valve 38 and (MS) clutch valve 43 causes application of the OD clutch element when the shift lever is in the D position, as indicated by PRND2L input 20.

Each clutch has a logical on and a logical off position. When a particular clutch is in the logical on position, it is frictionally engaged to a planetary gear set or other rotating element. Likewise, when a clutch is in a logical off position, it is released, allowing its associated rotational element to freely rotate. The logical on position may be accomplished by using the LR 34, 2C 36, OD 38, UD 40, 4C 41 or MS 43 solenoid-actuated valves to either apply or remove hydraulic pressure, depending on the particular clutch being applied.

Referring now to FIG. 2, the flow chart shown therein illustrates the fundamental steps of the EOL learn sequence of the present invention, as performed by the control system of FIG. 1. As is illustrated, the EOL learn sequence generally comprises satisfaction of all the requirements contained within decision block 52, and completion of seven (7) distinct phases starting with φ=0 and ending with φ=7. If any of the requirements of diamond 52 are not met, the sequence will not begin and, as indicated by block 54, a signal will be sent to the test module 48 on bus 46 conveying this information to the test operator. Each of these initial conditions or requirements is described below.

Initial Requirements

In order for the learn sequence to commence, the transmission control module 10 must receive as an input an EOL request from test module 48. This request preferably is an appropriate electrical signal received from the test module 48 which has been plugged directly or indirectly into the transmission control module 10. This portable piece of test equipment is typically available at the rolls test at the end of the vehicle assembly line or to a dealer or mechanic, such as the DRBII unit. The EOL request signal must be received continuously both before and throughout the test. The EOL request is continuously monitored in a background routine by the controller 10 and if at any time the EOL ceases being requested, the learn process is interrupted and the EOL sequence is aborted.

If an EOL sequence has not yet commenced, a PRND2L code signal 20 must indicate that the vehicle shift lever is physically in a neutral position (N) in order for the sequence to begin. This signal 20 is also continuously monitored in a background routine by controller 10 and if the EOL has already begun and is currently running, the PRND2L signal must thereafter indicate that the shift lever is in a drive position (D). This confirms to the control module 10 during the learn sequence that the transmission is fully in the drive shift lever position and is not between shift lever positions where the flow of hydraulic fluid to the learned elements may be restricted by the manual value within the hydraulic controls.

For the EOL sequence to begin or continue, the oil temperature must also be greater than a predetermined temperature, preferably greater than 60 and less than 200 degrees F. The oil temperature may be indicated directly as signal 22 or calculated by the controller 10 based on other known or sensed parameters. The brake must also be continuously applied, as indicated by input signal 18. Similarly, the engine speed (input signal 12) must be higher than a preset limit, preferably 500 rpm and the throttle angle (input signal 16) must be less than or equal to a set amount such as 3 degrees. As long as these conditions are continuously met, an EOL learn sequence will be enabled, that is, allowed to commence or continue. If one of these conditions ceases to be met, the EOL sequence is interrupted and an abort process as described below is invoked.

Once begun, the EOL learn sequence preferably comprises seven phases, from Phase 0 ($\phi=0$) to Phase 7 ($\phi=7$). The sequence progresses from phase to phase, in order, until the entire sequence has been completed or aborted. The purpose of the various phases is to effect sequential application of each of the clutch elements in an order which ensures a separation between rotational engine speed and turbine speed (slip). The magnitude and rate of this separation is used to recognize the point of application of an element in order to calculate the fluid fill volume of that element.

The elements are applied and released in a predefined sequence until the fill volume of each is learned. The cooperative application of elements in a predetermined sequence causes the turbine speed to be pulled down relative to the engine speed when the volume of fluid fed to the applying element has achieved its fill volume. This is because the brake is applied for the duration of the learn sequence, as required in diamond 52, and therefore the vehicle output speed is kept at 0 miles per hour.

During the entire EOL learn sequence, as well as thereafter, the fill volume (V) of each of the five elements is continuously monitored by the transmission control module 10. An instantaneous volume V is calculated for each element, in time increments of dt, as:

$$V=V_0+Qdt$$

where $V_0$=previous value of V

Q=flow rate=F($V_0$ and element)

dt=time increment

In the presently preferred embodiment, dt=14 milliseconds and $V_0$ is therefore the value of V calculated 14 milliseconds ago.

The steps in each of the phases of the EOL sequence, as applied to the automatic transmission described herein, are shown in the flow chart of FIG. 2. However, the overall purpose behind each step as described above should be kept in mind as the concept contained in the steps detailed below, with some minor modification, are equally well suited for application to various other types and configurations of transmissions.

Attention is also drawn to the graph of FIG. 3 which illustrates relative phase timing. Shown in the center plot of the graph is engine speed ($N_e$), turbine speed ($N_t$) and output speed ($N_0$) with respect to time. Plotted above is the corresponding pressure in the LR, 2C, 4C, UD and OD shift fill cavities. The volume of the fluid cavities of each element, as a general rule, generally tracks the pressure curve. The current fill volume of each element is tracked continuously by the transmission control module 10 every dt, or 14 m sec. The element logic for each valve element LR, 2C, 4C, UD, OD and MS solenoid valves is shown at the top of the graph. This portion of FIG. 3 illustrates when an element, including the initial conditions, is either turned on, off or being softly applied (as will be discussed). At the center plot of the graph of FIG. 3, identified along the line FVI, is illustrated the flagging of the fill volume required to engage each element. For instance, the flags set for the fill volumes of the 2C and 4C elements are indicated by numbers 108 and 114 respectively (See FIG. 3). These flags correspond to the slip between the turbine and the engine as depicted along the RPM line. This is the graphical representation of when slip occurs between the turbine speed (Nt) and engine speed (Ne), as can be seen along line RPM in FIG. 3.

Phase 0

Phase 0 begins at block 56 with the transmission control module 10 issuing a command signal on bus 42 to the engine control module 44 to increase the target engine idle speed to 1600 rpm for the duration of the EOL sequence. This speed ensures that source pressure or line pressure from the transmission pump remains at a preset regulated level, which most accurately replicates fluid conditions of the transmission in actual operation. Since the initial requirements in decision block 52 must have been met to arrive at Phase 0, the transmission shift must be in neutral causing the, LR, 2C, 4C, OD and UD clutches to be logically OFF. The LR clutch element being logically off in Phase 0 allows the OD element to therefore be turned on in Phase 1, thereby purging air from the OD fluid circuit (as will be discussed).

At block 59, a "start" signal is provided to test module 48 to instruct a vehicle or test module operator to physically shift the transmission from neutral to drive.

Phase 1

The physical shift into drive at block 60 causes the PRND2L input 20 to change from neutral to drive. This begins Phase 1 of the EOL sequence. (See also reference numeral 102 in FIG. 3). In block 61, the MS and OD solenoid-valves route fluid to the OD element, thereby turning the OD element on. The OD element remains on until the end of Phase 3, when it is turned off. As a result, air is purged from the entire OD circuit by Phase 5, when the fill volume of the OD element is determined. Pressurizing of the OD element occurs by the OD and MS valves routing transmission fluid to the OD clutch in response to an applying signal transmitted to OD solenoid-valve 38 and MS solenoid-valve 43 from transmission control module 10.

In block 62, similar to the OD element, air is purged from the 2C, 4C and UD elements in Phase 1 by initially pressurizing and then cycling these elements on and off, as may be seen in FIG. 3, and then venting. This purge includes not only the clutch apply cavity but also air trapped in any hydraulic lines or air entrapped in the hydraulic fluid itself. The purpose for this purge is to provide accurate fill volume measurements which are not corrupted by the measurement of the removal of air.

Phase 2

In Phase 2, the fill volume of the 2C clutch is learned. In block 66, the 2C clutch is applied by transmission control module 10 by transmitting an energizing signal to the 2C clutch solenoid across bus 28. The displaced fluid volume ($V_{2C}$) of the 2C clutch is continuously tracked during energization. Once the 2C element is applied, based on slip between the engine and turbine speed, a Fill Volume Identified (FVI) flag is set and an instantaneous volume of the 2C clutch ($V_{2C}$) may be obtained. After this flag is set, the fill volume of the 2C clutch VFL (2C) can be calculated as:

$$VFL(2C)=C_f V_{2C}$$

wherein $C_f$ is an appropriate correction factor based on actual test data as described in detail below and $V_{2C}$ is the captured instantaneous volume of the 2C clutch at the moment the FVI flag is set. (See reference numeral 108).

The Fill Volume Identified (FVI) flag is preferably set based upon a rotational speed difference between the turbine speed ($N_t$) and engine speeds ($N_e$), or the slip (S):

$$S = N_e - N_t$$

The FVI flag is preferably set based upon a predefined change or increase in the amount of slip (ds) between subsequent calculations by the transmission control module 10 using signals 12 and 14. In this embodiment, the FVI flag is set wherein the change in slip (ds) exceeds 6 rpm and wherein the current slip (S) exceeds a minimum slip ($S_m$) plus 40 rpm:

FVI SET: ds>6 rpm and $S_m$+40 rpm

In the sequence illustrated in FIGS. 2 and 3, slip between engine speed and turbine speed occurs by ensuring that there is another appropriate element applied at the time an element is learned. As shown in FIG. 3, in Phase 2 where the 2C clutch is learned, the OD clutch is fully applied at the moment the FVI flag (see numeral 108) is set and the 2C clutch is applied and learned. This is necessary to create the requisite reaction torque and resulting separation between the engine and turbine speeds used in this embodiment to recognize the point of application of a clutch element. The FVI flag, after being set in learning each fill volume, is reset.

To prevent an incorrectly calculated fill volume from affecting shift quality, controller 10 may be programmed to accept and record in RAM only a learned fill volume, VFL (2C) in this Phase, within a predefined difference from the stored nominal build volume, or within a defined "acceptable" range. The same is true regarding the remaining volumes learned in the remaining phases discussed below.

After the fill volume is learned for the 4C element in block 66, the 2C element is turned logically off and vented in block 68.

Phase 3

In Phase 3, at block 73, the 4C clutch is applied and may be learned in the same fashion described above in conjunction with the 2C clutch in Phase 1. The 4C shift clutch is applied via an energizing signal on bus 28 applied to the 4C shift solenoid-actuated valve 33. VFL (4C) is set to the instantaneous tracked fill volume for the 4C element upon the setting of a VFI flag, again multiplied by an appropriate correction factor, calculated as described above:

$$VFL(4C) = C_f V_{4C}$$

The updated value is stored in random access memory RAM memory of controller 10. The 4C shift clutch is then vented in block 72 and remains in a vented state throughout the remaining phases.

Phase 4

In Phase 4, at block 73, the OD clutch is vented and held at a low enough pressure to keep the solenoid switch valve from moving into the converter clutch position and high enough to transfer some torque to the LR gear set. If the solenoid switch valve moves to the converter clutch position, the LR clutch will not be filled. Instead, the converter clutch will be filled and an incorrect volume would be learned. If the pressure is too low, the OD clutch would not provide for an input torque and the controller would not be able to detect the application of the LR clutch.

At block 74, the fill volume of the LR clutch can be learned in same manner as above. (See also reference numeral 118 in FIG. 3). VFL (LR) is set as follows when the FVI flag is set:

$$VFL(LR) = C_f V_{LR}$$

The OD clutch and the LR clutch are then vented and turned off at block 76. Venting of the LR clutch allows time for the OD clutch to release. (See numeral 120). After the OD clutch has released, The LR clutch is softly re-engaged in block 78, then fully applied until the end of Phase 5.

Phase 5

The OD clutch is turned ON and learned at block 80 in Phase 5. Also, as discussed in Phase 4, the LR element remains logically on during this phase, providing the second engaged element (provided by the OD element in Phases 2–4) to supply the required slip between engine and turbine speed to determine the required fill volume. The transmission which the present invention is directed to can use either of two feed lines to fill the OD clutch element in drive, both are turned on to fill the OD element during EOL. The feed lines are fed by the OD and MS solenoid valves. As such, transmission control module 10 feeds the OD clutch element by activating OD solenoid valve 38 and MS solenoid valve 43 by providing an activation signal across busses 30 and 35 respectively. VFL (LR) is set to $C_f V_{LR}$ when an FVI flag is set.

Phase 6

Turning off and venting the LR element at block 82 at the beginning of Phase 6 prevents the inadvertent gear engagement if the shift lever is moved to reverse during testing of the UD clutch element. If the shift lever was moved to reverse during testing with the LR element applied, the vehicle could potentially engage reverse gear and drive away.

In Phase 6, at block 84, the UD clutch is applied and is learned. The UD shift clutch is applied via an energizing signal on bus 32 applied to the UD shift solenoid-actuated valve 40 VFL (UD) is set to the instantaneous tracked fill volume for the UD element upon the setting of a VFI flag, again multiplied by an appropriate correction factor, calculated as described above:

$$VFL(UD) = C_f V_{UD}$$

The updated value is stored in random access memory RAM memory of controller 10.

Phase 7

At block 88, transmission controller 10 issues a command signal on bus 42 to the engine controller 44 to return to a normal engine target idle speed (typically about 800 rpm). An "EOL sequence complete" signal is then sent on bus 46 to the test module 48. Block 90 ensures that transmission controller 10 will proceed to Phase 8 only upon the safe conditions of low vehicle idle speed or if the shift lever is moved to the park position. This is to ensure that the vehicle is in the park or idle speed is at a level low enough to ensure safe reentry into the normal shift pattern. Upon successful completion of block 90, block 93 softens entry into 1st gear with UD duty cycle. (See FIG. 2).

Phase 8

In Phase 8, at block 94, the shift logic is set back to its original state. At such, the shift logic selection is set:

in1 w/SLP=D, 2, or L inn w/SLP=N or R

This logic positions the transmission into normal first gear or neutral depending where the shift lever is positioned. If the shift lever is positioned in drive, second or low, then the shift logic is set to first gear. If the shift lever is positioned in neutral, park, or reverse, then the shift logic is positioned into neutral.

Abort Process

The abort process is a condition which may be activated in any phase above and is initiated upon failure of one of the requirements described in conjunction with diamond 52. If one of these requirements ceases to be met and the PRND2L code signal 20 indicates that the shift lever position is in overdrive, drive or low, the sequence immediately proceeds from the current phase to Phase 7. If the shift lever position as indicated by PRND2L code signal 20 is reverse or neutral, Phase 7 is immediately effected. With shift lever position=P, Phase 8 is immediately activated (One program loop in Phase=7. If desired, each phase may also be assigned a predefined time limit which, if exceeded, likewise triggers the abort process. In the sequence of the present embodiment Phase 2 is allowed 0.8 seconds before a time out occurs and the remaining phases allowed 1.6 seconds each.

The graph of FIG. 3 best shows the relative timing of each phase. As shown therein the learn sequence begins at reference numeral 100 in Phase 0 ($\phi$=0) with the LR clutch and UD clutch applied and the 2C, 4C, OD and UD clutches logically OFF. Phase 1 is initiated at 102 with the physical shift to overdrive and the purging of air from the 2C, 4C and UD clutch elements. Also, the MS and OD solenoid-valves rout fluid to the OD element, thereby pressurizing the OD clutch element, which remains logically on until the beginning of Phase 4.

In Phase 2, the 2C clutch element is applied and the fill volume is learned. Fluid flow to the 2C clutch at 104 with concurrent slight remaining capacity in 2C results in a build up in pressure which causes a separation between $N_e$ and $N_t$ at 106. A learned fill volume for the 2C clutch $V_{2C}$ can be calculated and learned after a change in this separation exceeds a predefined amount and an FVI flag is set. The 2C clutch is turned logically off and vented at the end of Phase 2. Phase 3 begins at 106 and requires the application of the 4C shift element to obtain another separation 114 and $V_{4C}$. The 4C clutch is then vented at 110 at the beginning of Phase 4. The LR element is applied at 110 while the OD clutch element is softly applied. $V_{LR}$ is then learned during the course of Phase 4. After the LR clutch element is learned, it is vented then softly reapplied until the end of Phase 5. In Phase 5, the OD element is applied through routing of fluid by the OD and MS solenoid-valves at 120. $V_{OD}$ can then be obtained. In Phase 6, the UD element is then applied and tested. $V_{UD}$ is then obtained. Phases 7 and 8 results in a graceful duty cycle exit to put the transmission softly into first gear.

While the above detailed description described the preferred embodiment of the present invention, it should be understood that the present invention is susceptible to modification, variation, and alteration without deviating from the scope and fair meaning of the subadjoined claims.

What is claimed is:

1. A method for determining fill volumes of a plurality of clutch elements in an automatic transmission, said method comprising:
    a. providing an automatic transmission attached to a vehicle engine having a plurality clutches wherein said plurality has at least 2C, 4C, LR, UD and OD clutch elements;
    b. monitoring a rotational speed of a turbine within a torque converter of said automatic transmission;
    c. monitoring a rotational speed of said engine;
    d. applying and recording each of said plurality in a predefined order;
    e. determining the fill volume of each of said plurality by applying each said element and recording said fill volume when said rotational speed of said engine varies from said rotational speed of said turbine by a predefined amount, wherein said fill volume of said OD clutch element is determined after said fill volume of said 2C and said 4C clutch element is determined.

2. A method as claimed in claim 1, wherein said rotational speed of said engine is increased before said fill volume of any of said plurality is applied and determined.

3. A method as claimed in claim 1, wherein said OD clutch is applied while said fill volume of said 2C and said 4C clutch is determined.

4. A method as claimed in claim 3, wherein said OD clutch is vented before said fill volume of said OD clutch is determined.

5. A method as claimed in claim 1, wherein said OD element is held at a low enough pressure to keep a solenoid switch valve from moving into a converter clutch position and high enough to transfer torque to said LR clutch element when said fill volume of said LR clutch element is determined.

6. A method as claimed in claim 1, further comprising the step of reducing said rotational speed of said engine after said fill volume of a last of said plurality is determined.

7. A method as claimed in claim 6, further comprising the step of determining whether said rotational speed of said engine is below a predetermined safe speed after the step of reducing said rotational speed of said engine after said fill volume of said last of said plurality is determined.

8. A method as claimed in claim 7, further comprising the step of shifting said automatic transmission into a first gear if said rotational speed of said engine is below said predetermined safe speed.

9. A method as claimed in claim 1, wherein said LR clutch element is turned off and vented before said fill volume of said UD element is determined.

10. A method for determining fill volumes of a plurality of clutch elements in an automatic transmission attached to a vehicle engine wherein said plurality comprises an OD, UD, LR, 2C and 4C clutch element, said method comprising:
    a. monitoring a rotational speed of a turbine within a torque converter of said automatic transmission;
    b. monitoring a rotational speed of said engine;
    c. applying said 2C clutch element and determining said fill volume of said 2C clutch element when said rotational speed of said turbine departs from said rotational speed of said engine by a predetermined amount;
    d. recording said fill volume of said 2C clutch;
    e. applying said 4C clutch element and determining said fill volume of said 4C clutch element when said rotational speed of said turbine departs from said rotational speed of said engine by a predetermined amount;

f. recording said fill volume of said 4C clutch;

g. applying said LR clutch element and determining said fill volume of said OD clutch element when said rotational speed of said turbine departs from said rotational speed of said engine by a predetermined amount;

h. recording said fill volume of said LR clutch;

i. applying said UD clutch element and determining said fill volume of said UD clutch element when said speed of said rotational speed of said turbine departs from said rotational speed of said engine by a predetermined amount;

j. recording said fill volume of said UD clutch;

k. applying said OD clutch element and determining said fill volume of said OD clutch element when said rotational speed of said turbine departs from said rotational speed of said engine by a predetermined amount.

l. recording said fill volume of said OD clutch.

11. The method of claim 10, further comprising the step of turning off and venting said OD element after said fill volume of said UD element is recorded and before said OD clutch is applied.

* * * * *